3,272,093
METHOD AND APPARATUS FOR THE MANUFACTURE OF A SQUARE-BOTTOM-BAG OF A WELDABLE MATERIAL
Friedrich Franz Brockmüller, Lengerich, Westphalia, Germany, assignor to Windmöller & Hölscher, Lengerich, Westphalia, Germany
Filed July 16, 1963, Ser. No. 295,440
Claims priority, application Germany, July 21, 1962, W 32,643
16 Claims. (Cl. 93—8)

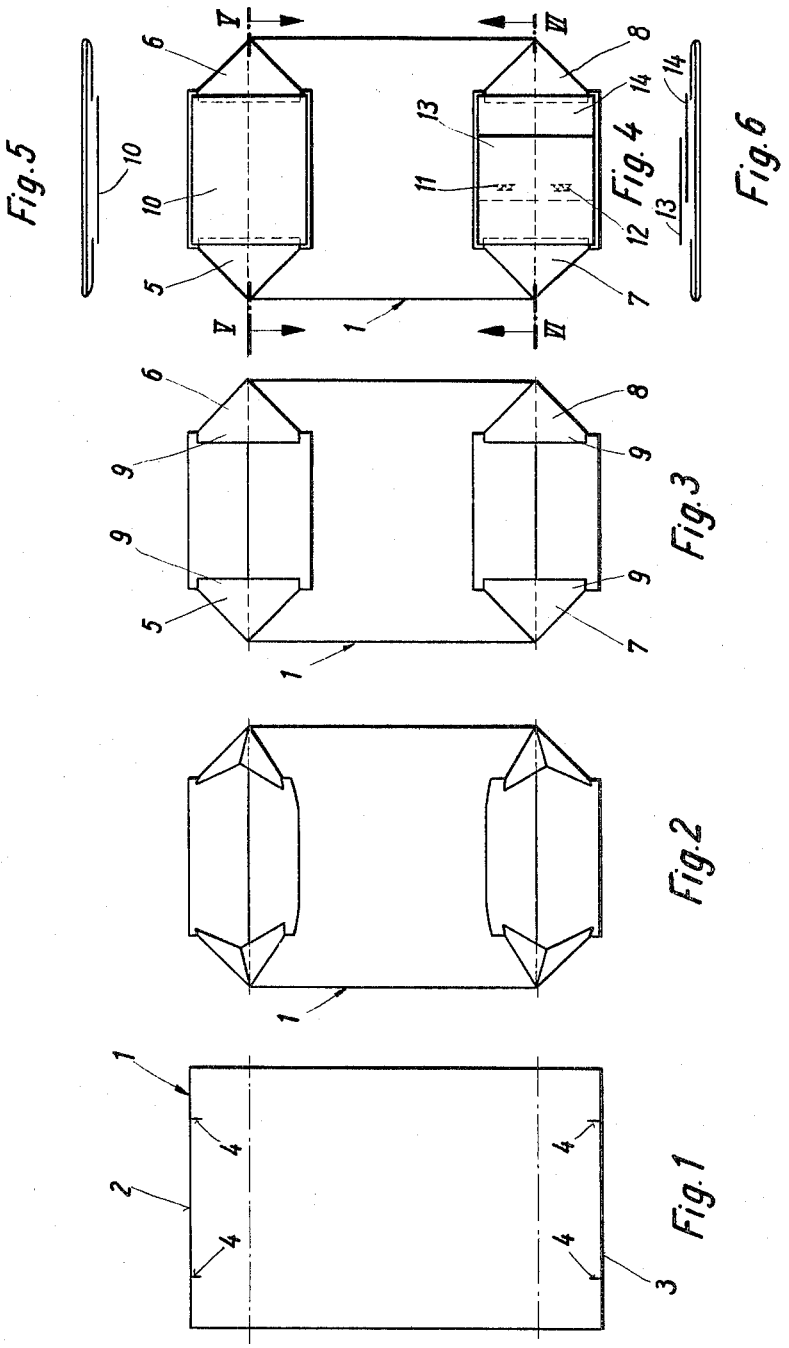

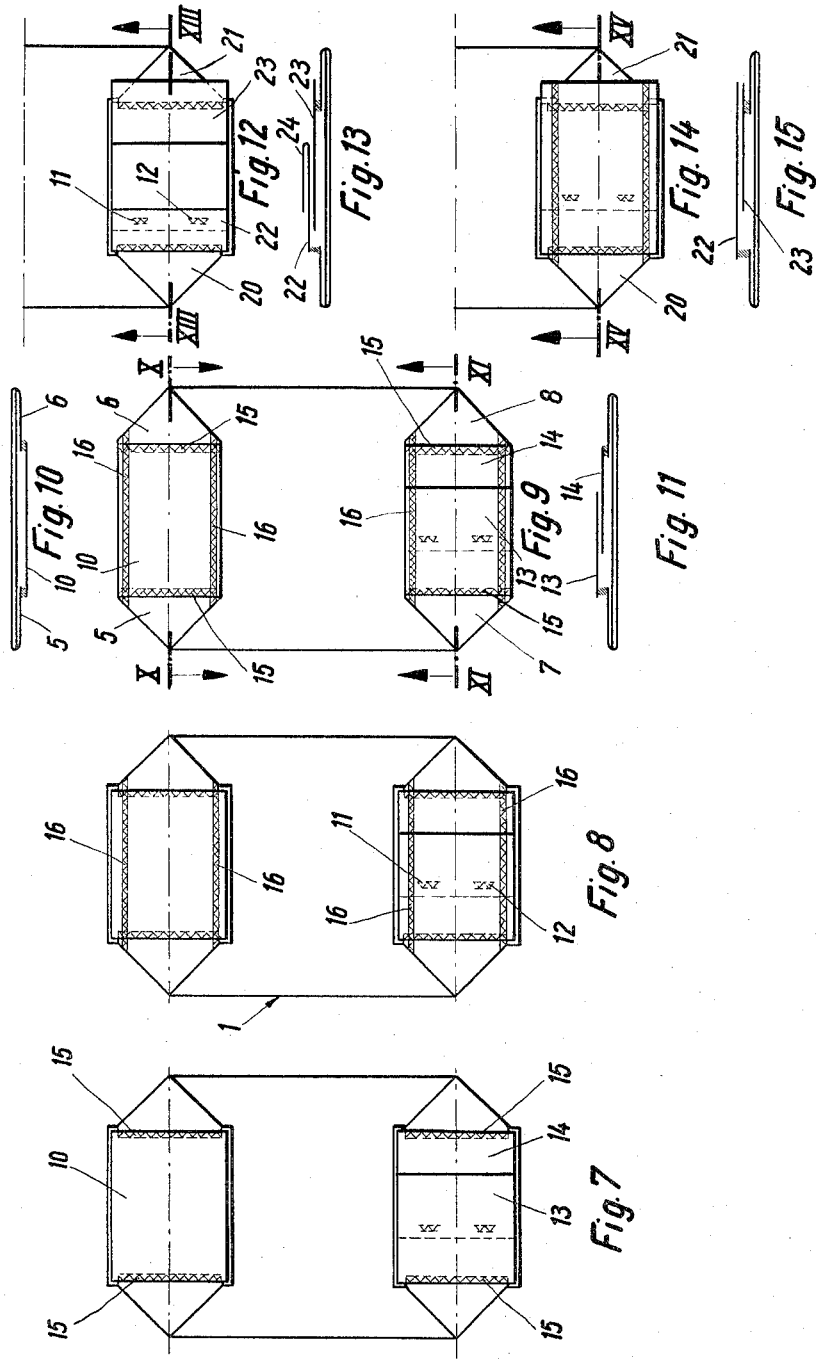

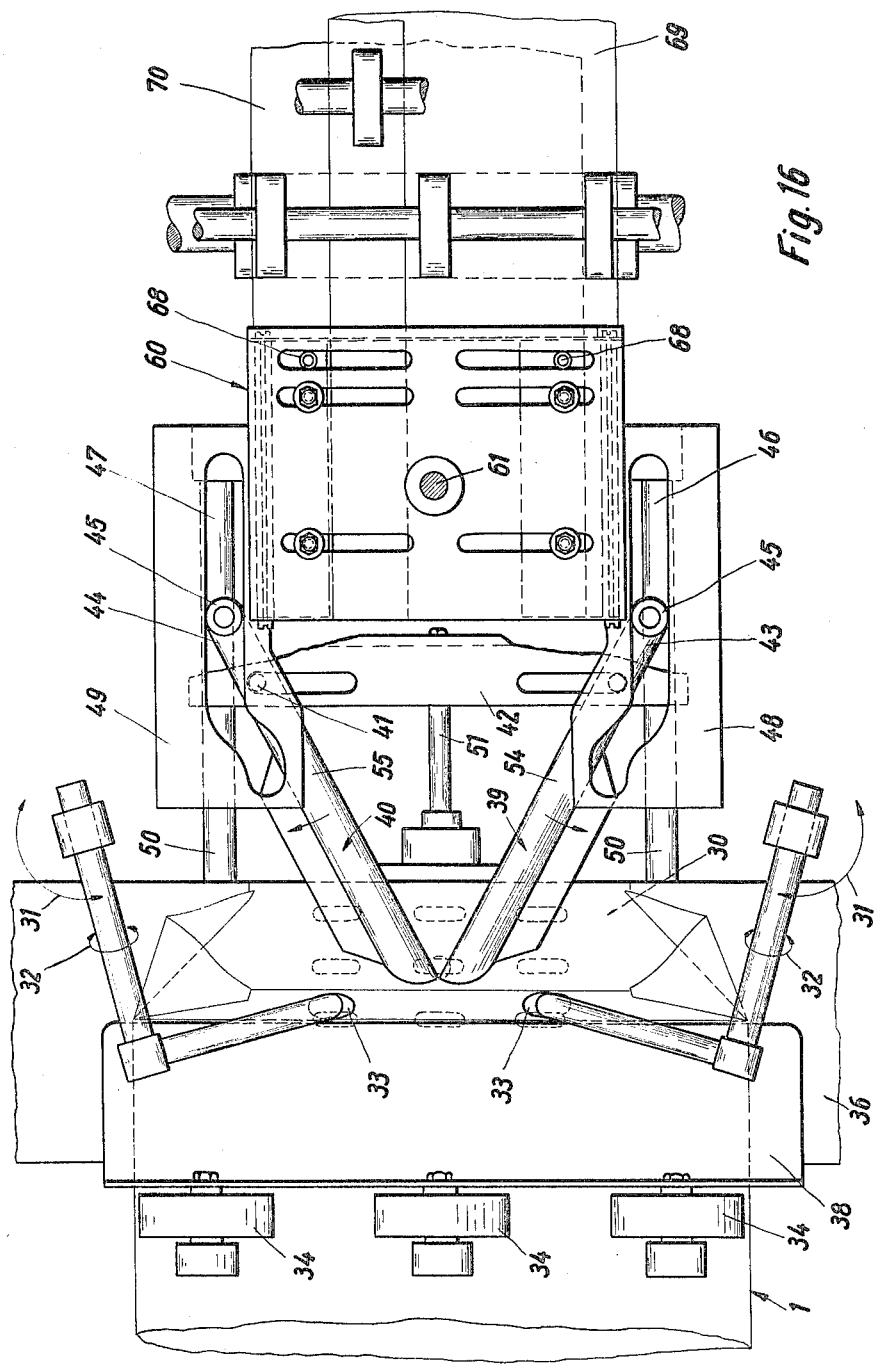

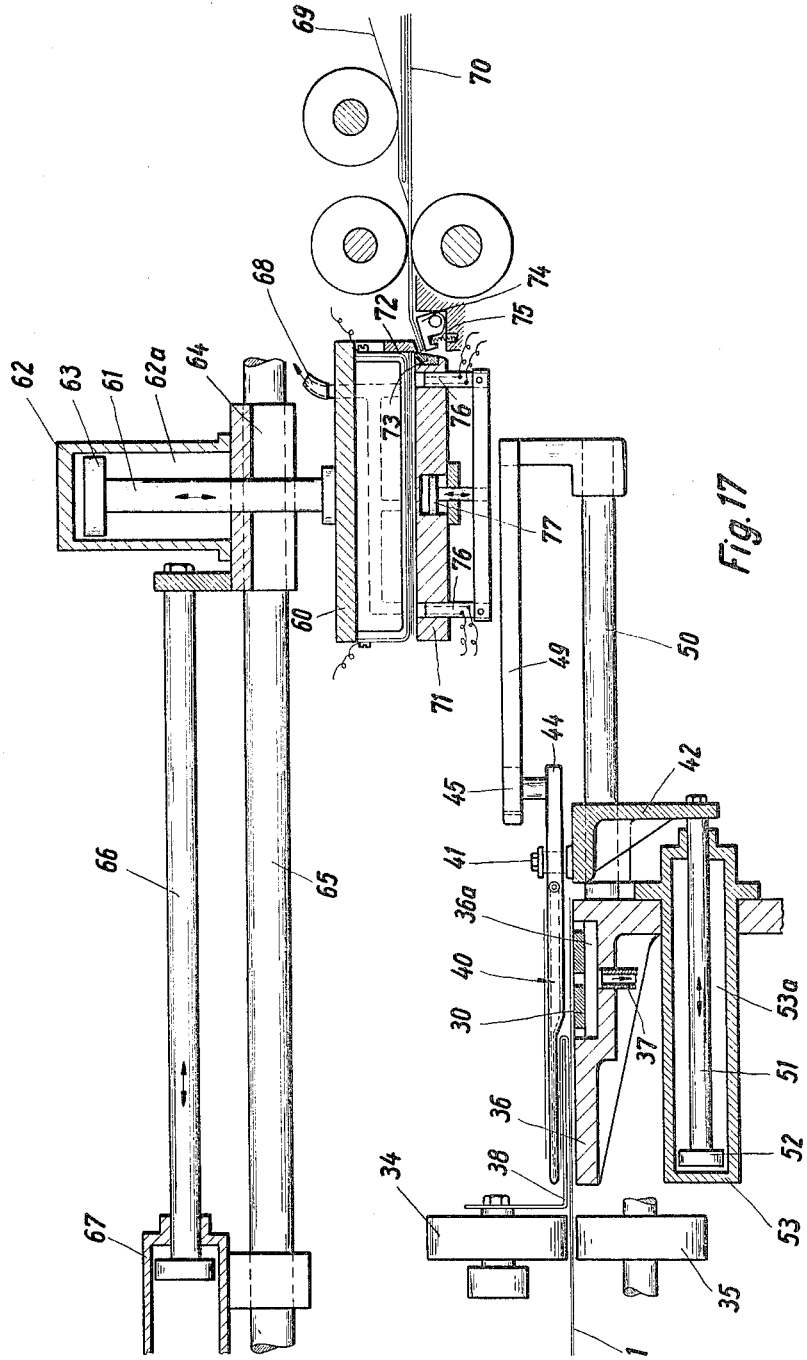

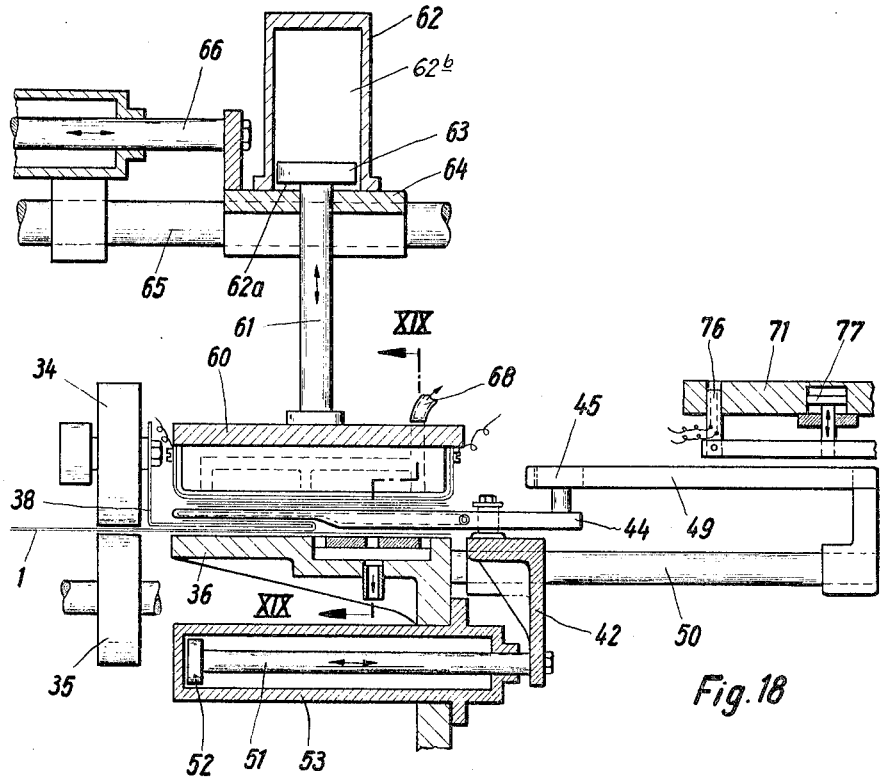
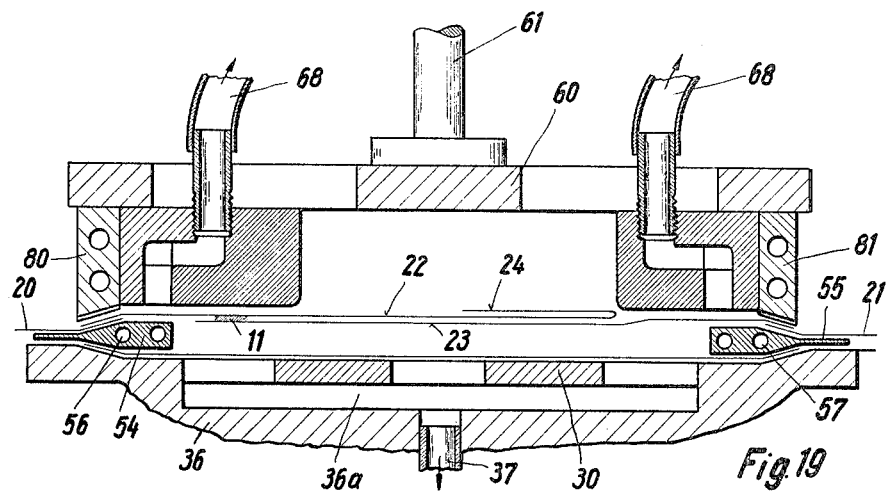
Fig. 18
Fig. 19
Inventor:
FRIEDRICH FRANZ BROCKMÜLLER
by
Arthur O. Klein
his Attorney United States Patent Office 3,272,093
Patented Sept. 13, 1966

The invention relates to a square-bottom bag of a weldable material, and to a method and equipment for its manufacture.

The manufacture of simple and cheap wrappings is essential for the economical use of weldable materials, preferably for throw-away wrappings, and used particularly for materials sensitive to moisture, such as, for example, artificial fertilizers, plastics granulates and cement.

There are already known plastic valve bags, made of a hose section which is welded at both ends and has a filler valve near one end. These bags, known to the trade as cushion bags, have the shape of a cushion when filled and cannot be stored reliable and in a space-saving manner.

The advantage of a good shape in the filled condition is offered by the so-called flat-bottom bags. Such bags made of weldable materials are already known, but, owing to thin uneconomical manufacture, they have not been widely adopted. An essential reason is the considerable material expenditure connected with the manufacture of the bottom.

The present invention has therefore the object of providing a flat-bottom bag of weldable material which can be manufactured at minimum material expenditures and by means of machines.

This object is realized by a flat-bottom bag, consisting of a hose section formed at one end by means of corner folds so that a hexagon is formed, and comprising at least one base sheet welded to the edge of the hose at the bottom.

According to the method for manufacturing the new flat-bottom bag, a section of hose is flattened at the end by means of corner folds and a base sheet is applied to this bottom end, followed by welding this base sheet first to the edge of the corner folds covered thereby, and then to the remaining edge of the hose, also covered by this base sheet.

For manufacturing a valve bag it is necessary also to expand and flatten the other end of the hose section and to weld together two base sheets of equal or different lengths, and offset one relative to the other, and applied to the end where the valve bottom is to be formed, and finally welded to the edge of the hose section.

In a preferred embodiment of this flat-bottom bag, each corner fold has a free end, formed by a cut in the edge of the hose section and connected with the base section by a welded seam, and the welded seams connecting the edge portions of the bottom end located perpendicularly to the direction of the hose cross the welded seams of the corner folds.

An arrangement for making these flat-bottom bags comprises in its simplest form a suction device for pulling open the bottom end of the hose section, a spreading device for flattening the opened out bottom end, a feeder for the base sheets, and welding devices for welding the hose edge to the base sheet.

For manufacturing a valve bag, such a mechanism will comprise a suction device, spreader and feeder for each end, as well as a set of welding devices, and a device for connecting the two base sheets forming the valve.

Conveniently, the individual devices are adjustable to different widths of the bags and bottoms, or their parts are interchangeable.

The invention will be further described, by way of example, with reference to the accompanying drawings, in which:

FIG. 1 shows a section of hose used according to the invention;

FIGS. 2 to 4 and 7 to 9 show the individual manufacturing stages of a first embodiment of a flat bottom valve bag;

FIGS. 5 and 6 are cross-sections along the lines V—V and VI—VI in FIG. 4, respectively;

FIGS. 10 and 11 are cross-sections along the lines X—X and XI—XI, respectively, in FIG. 9;

FIG. 12 shows the valve bottom end of a flat-bottom valve bag according to a second embodiment in the stage corresponding to that shown in FIG. 7;

FIG. 13 is a cross-section along the line XIII—XIII in FIG. 12;

FIG. 14 shows the finished valve bottom end according to the second embodiment of this invention;

FIG. 15 is a cross-section along the line XV—XV in FIG. 14;

FIG. 16 shows the suction, spreading and feeding device of an arrangement for making the valve bottom, viewed from the top;

FIG. 17 is an axial cross-section of the arrangement shown in FIG. 16;

FIG. 18 is a view corresponding to FIG. 17, showing the arrangement in another operating position; and FIG. 19 is a cross-section along the line XIX—XIX in FIG. 18 on an enlarged scale.

The new method of manufacturing a flat-bottom valve bag will now be described with reference to FIGURES 1 to 11.

A plastic hose section 1 is provided at both edges 2, 3 with short cuts 4 in both layers of the flattened hose (FIG. 1). Then the ends of the hose section 1 are opened out (FIG. 2) and flattened down (FIG. 3), forming corner folds 5, 6, 7, 8 which have an extension 9, formed by the recesses or cuts 4. Then a base sheet 10 is applied to the bottom end having the corner folds 5 and 6 (FIGS. 4 and 5), whilst the bottom end with the corner folds 7 and 8 is provided with two bottom sheets 13, 14 of equal length, but offset one to the other, and connected by spot welds 11, 12 (FIGS. 4 and 6). Next the base sheets 10, 13, 14 are connected by welding with the extensions 9 of the corner folds (welding seams 15 in FIG. 7). Finally, the parts of the edges 2, 3 perpendicular to the direction of the hose are welded to the base sheet 10 or the base sheets 13, 14 (welding seams 16 in FIG. 8). The arrangement of the welding seams is here such that the seams 15 cross the seams 16. After cutting off the portions of the longitudinal side edges of the bottom which project over the welded seams 16, the flat-bottom valve bag is finished (FIG. 9). As may be seen from FIG. 11 the two bottom sheets 13, 14 form a valve. The two spot welds 11, 12 are spaced one from the other, forming a valve duct between them.

FIGURES 12 to 15 show a second embodiment of a a valve bottom end of a flat-bottom valve bag.

The open end of a flat-bottom valve bag, having the corner folds 20, 21, is provided with two base sheets 22, 23, but in this embodiment these sheets are of different lengths. Also here, these two sheets are connected by spot welds 11, 12. The lengths of these two sheets are such that the desired offset is obtained at one end, whilst the other ends are flush. In order to weld the lower base sheet 23 to the corner fold 21, the base sheet 22 is applied to the bottom end in a folded condition, forming a rim 24 (FIGS. 12 and 13). In this condition, the base sheets are connected by welds to the corner folds. Then the edge 24 is folded back and the two base sheets 22, 23 are welded to the edge portions of the hose end, normal to the direction of the hose, as in the first embodiment (FIGS. 14 and 15). Also here, the portions of the long bottom edges projecting over the longitudinal bottom welds are finally cut off.

By extending the base sheets 22, 23—to the right in FIG. 15—and the corresponding extension of the longitudinal bottom welds, it is possible to form a protruding valve hose which may be closed by welding after the filling of the bag.

The arrangement, described hereinafter with reference to FIGURES 16 to 19, serves for the manufacture of a valve bottom according to FIG. 12. It comprises a suction device for opening the bottom end of the hose section 1, consisting of a suction plate 30 for holding the lower wall of the flattened hose section, and two suckers 33 (FIG. 16) for opening the bottom end, which cooperate with the upper hose wall, and which are rotatably mounted in the direction of the arrow 31 and pivotally mounted in the direction of the arrow 32.

The hose section 1, supplied by conveyor rollers 34, 35, operating in pair, in the direction perpendicular to its long axis, rests with its bottom end on a table 36 having a suction channel 36a which is connected to a suction conduit 37 and covered by the suction plate 30 (FIG. 17). A plate 38 serves to define the bottom center fold and as support for the folded back portion of the upper hose wall after the opening.

The arrangement also comprises a spreading device, consisting of two two-armed levers 39, 40. These spreading levers are each pivotably mounted about a screwed bolt 41 on a support 42. The short lever arms 43, 44 carry each a roller 45 on their free ends; these rollers move in guide slots 46 and 47, respectively, in fixed guide members 48, 49, causing during the displacement of the support 42 in the axial direction of the hose 1 the pivoting movement of the spreader levers. The support 42 is displaceable on guide rods 50 and mounted on the free end of the piston rod 51 of a double-acting piston 52, fitted in a cylinder 53. The long lever arms 54, 55 of the spreader levers 39, 40 have the cross-section shown in FIG. 19. Inside these lever arms there is a conduit system 56 and 57, respectively, carrying a cooling medium.

A feeder serves to apply the base sheets to the opened bottom end. This feeder is a ram 60 mounted on the free end of the piston rod 61 of a double-acting piston 63 mounted in a vertical cylinder 62. This cylinder 62 rests on a support 64 which is mounted displaceably in the axial direction of the hose section 1 on guide rods 65 and fixed to the free end of the piston rod 66 of a double acting piston 67. The base sheets are held against the ram 60 by a vacuum, produced by extracting the air from the conduits 68.

The free ends of base sheet material webs 69, 70 are located on a table 71 (FIGS. 17 and 18), on to which the ram 60 may be lowered. A vertically displaceable knife edge 72, acting in association with the ram 60, cooperates with a fixed knife edge 73 to cut off the free ends of the base sheet material webs. A supporting member 74, pivotably mounted from its rest position by the knife edge 72 against the force of a spring 75, serves to ensure the positioning of the free ends of the material webs on the table 71. Two welding rams 76 are displaceably located in the table and may be moved by a double-acting piston 77 with their operating surface into the plane of the table in order to join the cut off free ends of the material webs 69, 70, forming the base sheets 22, 23, by spot welds 11, 12.

As may be seen more particularly from FIG. 19, the ram 60 has on its sides located parallel to the long direction of the hose a welding jaw 80 and 81, respectively, through which flows a cooling medium. The welding jaw 80 cooperates with the lever arm 54 of the spreader lever 39 to weld the base sheet 22 to the corner fold 20, whilst the welding jaw 81 cooperates with the lever arm 55 of the spreader lever 40 to weld the base sheet 23 to the corner fold 21 (see FIG. 19 in conjunction with FIG. 12).

The long bottom welds, running normal to the direction of the hose, and the cutting off of the protruding portions from the bottom edges may be effected by any suitable, known, means, which are not shown and need not be described.

The arrangement described and shown in FIGURES 16 to 19 serves for the manufacture of a valve bottom. For the making of a simple bottom, the arrangement may be correspondingly more simple. Since in this case only a single bottom sheet 10 (FIGS. 4 and 5) is to be attached to the open bottom end, the arrangement in the table for joining two bottom sheets may be omitted.

The arrangement operates as follows:

After the hose section 1 has been introduced into the apparatus, air is extracted from the suction duct 36a through the suction conduit 37, and the resulting vacuum locates the flattened lower wall of the hose section on the table 36. The suckers 33 are applied to the upper wall of the hose section, lift the same in the direction of the arrow 31 and are pivoted away from the lower wall in the direction of the arrow 32. Simultaneously, the spreader levers 39, 40, positioned at the initial moment of the opening movement in the right-hand limit position in FIG. 16, are moved leftwards by introducing compressed air into the working chamber 53a of the cylinder 53 (FIG. 17). During this operation, the lifted upper wall of the hose section is folded flat about the edge of the plate 38. During the last part of their movement, the spreader levers carry out a pivoting movement in the direction of the arrow shown in FIG. 16, and engage with their knife-edge pointed ends under the corner folds (FIG. 19). The free ends of the material webs 69, 70, applied to the table 71 already during the introduction of the hose section, are cut during the lowering of the ram 60, and simultaneously with the opening of the hose section. At the same time, the welding rams are lifted so that both base sheets are welded together. By evacuating air from the conduits 68, the base sheets 22, 23 are held by the resulting vacuum against the ram 60. The ram is lifted off the table 71 already during the opening of the bottom end of the hose section 1, by introducing compressed air into the chamber 62a of the cylinder 62. During the pivoting movement of the spreader levers 39, 40, the ram 60 is moved from its right-hand limit position (FIG. 17) towards the left over the table 37 and lowered onto the spreader lever, which have meanwhile reached their limit position, by introducing compressed air into the chamber 62b of the cylinder 62. By means of the welding jaws 80, the base sheets 22, 23 are now welded to the corner folds 20, 21 (FIG. 19). Then the spreader levers are disengaged from the corner folds, and at the same time the ram 60 is again lifted by introducing compressed air into the chamber 62a of the cylinder 62. The ram 60 and the spreader levers 39, 40 are then moved to the right, and when the spreader levers have released the hose section 1, the same is moved to the appliance for welding the longitudinal bottom seams whilst the next hose section is introduced. The cycle is then repeated.

In order to provide an adjustment to different widths of bags or bag bottoms, the length of the lever arms carrying the suckers 33 is adjustable. The spreader levers 39, 40 and the guides 48, 49 may be easily exchanged. In order to adjust the spreader levers to another width, it is only necessary to slacken the screwed bolts 41, to displace them accordingly in the oblong holes in the carrier 42 and to tighten them again. The guides 48, 49 are similarly adjusted by slackening, adjusting and tightening. Also the welding jaws 80, 81 may be easily exchanged. In order to adapt them to different bag widths, they are adjustable in the direction normal to the direction of the hose, together with the supporting suction jaws of the ram 60.

In order to carry out welding of PVC or materials with similar properties, the welding jaws 80, 81 and the spreader levers 39, 40 may be formed by electrodes of an HF welding machine.

It is of course, to be understood that what has been described above is applicable not only to square-bottom plastic valve bag production but may also be applied to the production of other types of bags. It is, therefore, not desired to restrict the invention to the particular form of construction illustrated and described, but to cover all modifications that may fall within the scope of the appended claims.

I claim:

1. A method for manufacturing a flat-bottom bag of weldable material, comprising the steps of opening a tubular section at its bottom end and flattening said tubular section, thereby forming a pair of triangular corner folds in said bottom end, applying a base sheet to said opened bottom end thereby covering the edges of said pair of triangular corner folds and the edges of the bottom end of said tubular section with said base sheet, first joining each triangular corner fold to said base sheet by means of a first pair of welding seams, and then joining said base sheet to the edges of the bottom end of said tubular section by means of a second pair of welding seams, said second pair of welding seams crossing said first pair of welding seams and ending in the short edges of said triangular corner folds in said bottom end.

2. A method for manufacturing a flat-bottom bag of weldable material according to claim 1, including the steps of opening said tubular section at its other end and flattening said tubular section, thereby forming a second pair of triangular corner folds in said other end, joining a pair of base sheets together in staggered longitudinal relationship with respect to each other by welding together said pair of base sheets so as to leave a free space between the welded joints thereof, applying said pair of joined base sheets to said other end of said tubular section, thereby covering the edges of said second pair of triangular corner folds and the edges of the other end of said tubular section with said pair of joined base sheets, first joining each triangular corner fold of said second pair of triangular corner folds to said pair of joined base sheets by means of a third pair of welding seams, and then joining said pair of joined base sheets to the edges of said other end of said tubular section by means of a fourth pair of welding seams, said fourth pair of welding seams crossing said third pair of welding seams and ending in the short edges of said triangular corner folds in said other end.

3. The method for manufacturing a flat-bottom bag of weldable material as set forth in claim 1, including the step of making a pair of short cuts in the bottom end edge of said tubular section prior to opening the latter in order to extend the subsequently formed triangular corner folds thereof.

4. The method for manufacturing a flat-bottom bag of weldable material as set forth in claim 2, including the step of making a pair of short cuts in the other end edge of said tubular section prior to opening the latter in order to extend the subsequently formed triangular corner folds thereof.

5. The method for manufacturing a flat-bottom bag of weldable material as set forth in claim 1, wherein portions of said base sheet protrude beyond said second pair of welding seams after said base sheet has been joined to the bottom end of said tubular section by means of said second pair of welding seams, and including the step of cutting off said protruding portions of said base sheet.

6. The method for manufacturing a flat-bottom bag of weldable material as set forth in claim 2, wherein portions of said pair of joined base sheets protrude beyond said fourth pair of welding seams, after said pair of joined base sheets has been joined to the other end of said tubular section by means of said fourth pair of welding seams, and including the step of cutting off said protruding portions of said pair of joined base sheets.

7. A device for manufacturing flat-bottom bags of weldable material from tubular stock, comprising in combination, a suction device adapted to open one end of a flattened tubular section of weldable material, said suction device including a suction plate, air suction means operatively mounted in said suction plate for holding the lower wall of said flattened tubular section, a pair of sucker arms pivotably mounted in said device above said suction plate and adapted to engage the upper wall of said flattened tubular section and open thereby said end of said flattened tubular section, a plate fixedly mounted adjacent said suction plate and adapted to define a center fold in the tubular stock and to support a portion of said upper wall of said tubular section which is folded back during the opening of the end thereof, a pair of spreader arms swingably mounted in said device adjacent to said suction plate and adapted to spread the opened end of said tubular section until said end assumes a substantially flat configuration with a pair of corner folds, base sheet feeding means operatively mounted in said device and adapted to position at least one base sheet on said end of said tubular section spread by said pair of spreader arms so that the edges of said pair of corner folds are covered by said base sheet and welding jaw means operatively mounted in said device and adapted to weld said base sheet to said end while the latter is being spreadingly held by said pair of spreader arms.

8. The device for manufacturing flat-bottom bags of weldable material from tubular stock as set forth in claim 7, wherein a pair of base sheets are positioned over said end spread by said pair of spreader arms, and including second welding ram means operatively mounted in said device for welding together said pair of base sheets so as to form a valve opening therebetween prior to welding said pair of base sheets to said end by said welding jaw means.

9. The device for manufacturing flat-bottom bags of weldable material from tubular stock as set forth in claim 7, wherein said welding jaw means comprises two separately mounted pairs of welding jaws, each of said pairs of welding jaws being adapted to cooperate with one of the two ends of said tubular section of weldable material.

10. The device for manufacturing flat-bottom bags of weldable material from tubular stock as set forth in claim 7, wherein said pair of spreader arms are movably mounted in the axial direction of said tubular section, a carrier operatively mounted in said device, each arm of said pair of spreader arms being pivotably mounted on said carrier and being movable along fixed guide means in said carrier.

11. The device for manufacturing flat-bottom bags of weldable material from tubular stock as set forth in claim 10, including guide rod means, said carrier being movably mounted on said guide rod means, and double-acting piston means connected to said carrier and adapted to reciprocally move said carrier along said guide rod means.

12. The device for manufacturing flat-bottom bags of weldable material from tubular stock as set forth in claim 7, wherein said pair of spreader arms include cooling passage means for carrying a cooling medium therethrough.

13. The device for manufacturing flat-bottom bags of weldable material from tubular stock as set forth in claim 7, wherein said base sheet feeding means compurise a ram having suction means therein, said ram being vertically reciprocally movably mounted and being displaceable in the axial direction of said tubular section.

14. The device for manufacturing flat-bottom bags of weldable material from tubular stock as set forth in claim 13, including first vertical double-acting piston means connected to said ram, horizontal guide rod means, and second horizontal double-acting piston means connected to said ram and adapted to reciprocally move said ram along said horizontal guide rod means.

15. The device for manufacturing flat-bottom bags of weldable material from tubular stock as set forth in claim 14, including a table, feed roller means feeding the free end of at least one base sheet material web onto said table, said ram being displaceable by said first vertical double-acting piston means over said table, cutting means operatively mounted on said table and said ram and adapted to cooperate with said ram so that when the latter is lowered onto said table a base sheet is being cut off from said web by said cutting means.

16. The device for manufacturing flat-bottom bags of weldable material from tubular stock as set forth in claim 15, comprising a pair of welding rams reciprocally movably mounted in said table with their effective surfaces into and away from the plane of said table, third double-acting piston means connected to said pair of welding rams, said pair of welding rams being adapted to weld together said pair of base sheets so as to form a valve opening therebetween.

References Cited by the Examiner
UNITED STATES PATENTS

| | | | |
|---|---|---|---|
| 2,224,656 | 12/1940 | Robinson | 93—28 |
| 2,609,734 | 9/1952 | Bardet | 93—8 |
| 2,693,741 | 11/1954 | Speicher et al. | 93—8 |
| 2,722,165 | 11/1955 | Yount | 93—22 |
| 3,043,199 | 7/1962 | Niemeyer | 93—8 |
| 3,092,303 | 6/1963 | Woerner | 229—62.5 |
| 3,130,897 | 4/1964 | Poklukar et al. | 229—62.5 |
| 3,150,573 | 9/1964 | Piazze | 93—35 |
| 3,195,424 | 7/1965 | Camerini | 93—35 |
| 3,195,801 | 7/1965 | Symons et al. | 229—62.5 |

BERNARD STICKNEY, *Primary Examiner.*